United States Patent [19]
Cho

[11] Patent Number: 6,057,939
[45] Date of Patent: May 2, 2000

[54] APPARATUS AND METHOD FOR AUTOMATICALLY GENERATING A FACSIMILE DOCUMENT USING A MULTI-FUNCTIONAL IMAGE READING AND RECORDING DEVICE

[75] Inventor: Gyo-O Cho, Suwon, Rep. of Korea

[73] Assignee: SamSung Electronics Co., Ltd., Kyungki-do, Rep. of Korea

[21] Appl. No.: 08/980,355

[22] Filed: Nov. 28, 1997

[30] Foreign Application Priority Data

Nov. 28, 1996 [KR] Rep. of Korea ................ 96-58943

[51] Int. Cl.⁷ .................................................. H04N 1/00
[52] U.S. Cl. ........................................ 358/401; 358/405
[58] Field of Search ........................... 358/400, 442, 358/443, 439, 434; 379/100.09, 102.02, 102.03; 395/200.04, 200.11

[56] References Cited

U.S. PATENT DOCUMENTS

| | | |
|---|---|---|
| 4,991,200 | 2/1991 | Lin ........................................... 379/100 |
| 4,996,707 | 2/1991 | O'Malley et al. ....................... 379/100 |
| 5,267,302 | 11/1993 | Kotani ..................................... 379/100 |
| 5,303,067 | 4/1994 | Kang et al. .............................. 358/442 |
| 5,361,296 | 11/1994 | Reyes ........................................ 379/96 |
| 5,452,106 | 9/1995 | Perkins .................................... 358/468 |
| 5,459,584 | 10/1995 | Gordon et al. ......................... 358/434 |
| 5,528,385 | 6/1996 | Manning ................................ 358/440 |
| 5,577,108 | 11/1996 | Mankovitz ............................... 379/97 |
| 5,588,047 | 12/1996 | Rosengren ............................. 379/100 |
| 5,592,307 | 1/1997 | Murai ..................................... 358/468 |
| 5,608,786 | 3/1997 | Gordon ................................. 379/100 |
| 5,617,221 | 4/1997 | DeVries et al. ........................ 358/442 |
| 5,668,642 | 9/1997 | Yoshida .................................. 358/400 |
| 5,696,600 | 12/1997 | Perkins .................................... 358/442 |
| 5,796,493 | 8/1998 | Murai et al. ........................... 358/442 |
| 5,847,843 | 12/1998 | Shibata .................................. 358/440 |
| 5,870,549 | 2/1999 | Bobo, II ............................ 395/200.36 |

*Primary Examiner*—Jerome Grant, II
*Attorney, Agent, or Firm*—Robert E. Bushnell, Esq

[57] ABSTRACT

A multi-functional facsimile connected to a personal computer automatically prints a facsimile document when the computer is unable to receive the data. The multi-functional facsimile device sends a ring signal to the computer when a call is detected and waits a predetermined number of rings before printing out the document. If the computer gives the appropriate response signals before the predetermined number of ring signals have been detected then the facsimile data is transferred to the central processing unit of the personal computer. Otherwise, the multi-functional facsimile device automatically prints the facsimile document.

9 Claims, 2 Drawing Sheets

APPARATUS AND METHOD FOR AUTOMATICALLY GENERATING A FACSIMILE DOCUMENT USING A MULTI-FUNCTIONAL IMAGE READING AND RECORDING DEVICE

BACKGROUND OF THE INVENTION

1. Field of the Invention

The present invention relates to a multi-functional facsimile connected to a personal computer and, more particularly, to an apparatus and method for receiving facsimile documents when the personal computer is incapable of receiving data.

2. Background Art

With the wide variety of electronic products that are commonly used in offices today, the use of multi-functional devices in combination with personal computers is an efficient way of controlling costs while increasing available tools and capabilities. One popular combination is a multi-functional fax machine that is connected to a portable computer. Exemplars of recent efforts in the art are found in U.S. Pat. No. 5,452,106 to Perkins entitled Modem Device for Communication of Facsimile or File Data, U.S. Pat. No. 5,617,221 to DeVries entitled Facsimile Modem For Passing Image Informnation to a Facsimile Machine and Computer, U.S. Pat. No. 5,303,067 to Kang entitled Computer Connection Circuit in Facsimile, U.S. Pat. No. 5,668,642 to Yoshida entitled Image Data Communication Apparatus Capable of Receiving Image Data During Power Failire, U.S. Pat. No. 5,459,584 to Gordon entitled Facsimile Telecommunicationis System and Method, U.S. Pat. No. 5,608,786 to Gordon entitled Unified Messaging System and Method, U.S. Pat. No. 5,577,108 to Mankovitz entitled Information Distribution System with Self-Contained Programmable Automatic Interface Unit, and U.S. Pat. No. 4,996,707 to O'Malley entitled Text-To-Speech Converter of a Facsimile Graphic Image.

The multi-functional facsimile has two different receiving modes, the facsimile mode and the PC (personal computer) mode. When the multi-functional facsimile is in the facsimile mode it will print out all received facsimile documents directly. When the facsimile machine is in PC mode any data transmitted or received bypasses the facsimile machine and is handled directly by the personal computer. The PC mode runs using software that is installed in the personal computer. For the facsimile device to run correctly in PC mode the cable connecting it to the personal computer must be securely attached.

While in the PC mode of operation, when the facsimile machine detects the ring signal of an incoming call, the facsimile transmits the ring signal to the personal computer and waits for a response. Once the facsimile machine receives the appropriate response from the computer, the incoming, document data is sent to the computer. After the computer receives the document data, the conresponding facsimile document can be printed out by a printer or displayed on the computer monitor.

I have observed however, that when the cable connecting the facsimile machine to the portable computer to the personal computer is disconnected or the personal computer is turned off, the facsimile machine is unable to transmit the document data to the personal computer. This results in the document data not being received because the facsimile device is in PC mode and the computer is unable to transfer the appropriate response signal.

SUMMARY OF THE INVENTION

Accordingly, it is an object of the present invention to provide an improved multi-functional facsimile device.

It is another object to provide a multi-functional facsimile device that automatically generates a facsimile document when an attached personal computer is incapable of receiving the facsimile data.

It is still another object to provide a method for automatically generating a facsimile document when an attached personal computer is incapable of receiving the facsimile data.

These and other objects may be achieved, using a multi-functional facsimile device that is connected to a personal computer. When the multi-functional facsimile device is in PC mode and detects a ring signal, the facsimile automatically transmits the ring signal to the computer and waits for the personal computer to respond. When the computer receives the ring signal, the computer returns an acknowledgment signal in response and then receives the facsimile data. The computer directly processes and manipulates the facsimile data without any cooperation or interference by the facsimile unit. If the personal computer does not send the acknowledgment signal within a predetermined number of ring signals, then the facsimile machine using either a hardware or software switch, severs the connection between the facsimile and the computer and then directly automatically prints the facsimile document on a printable medium.

BRIEF DESCRIPTION OF THE DRAWINGS

A more complete appreciation of this invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
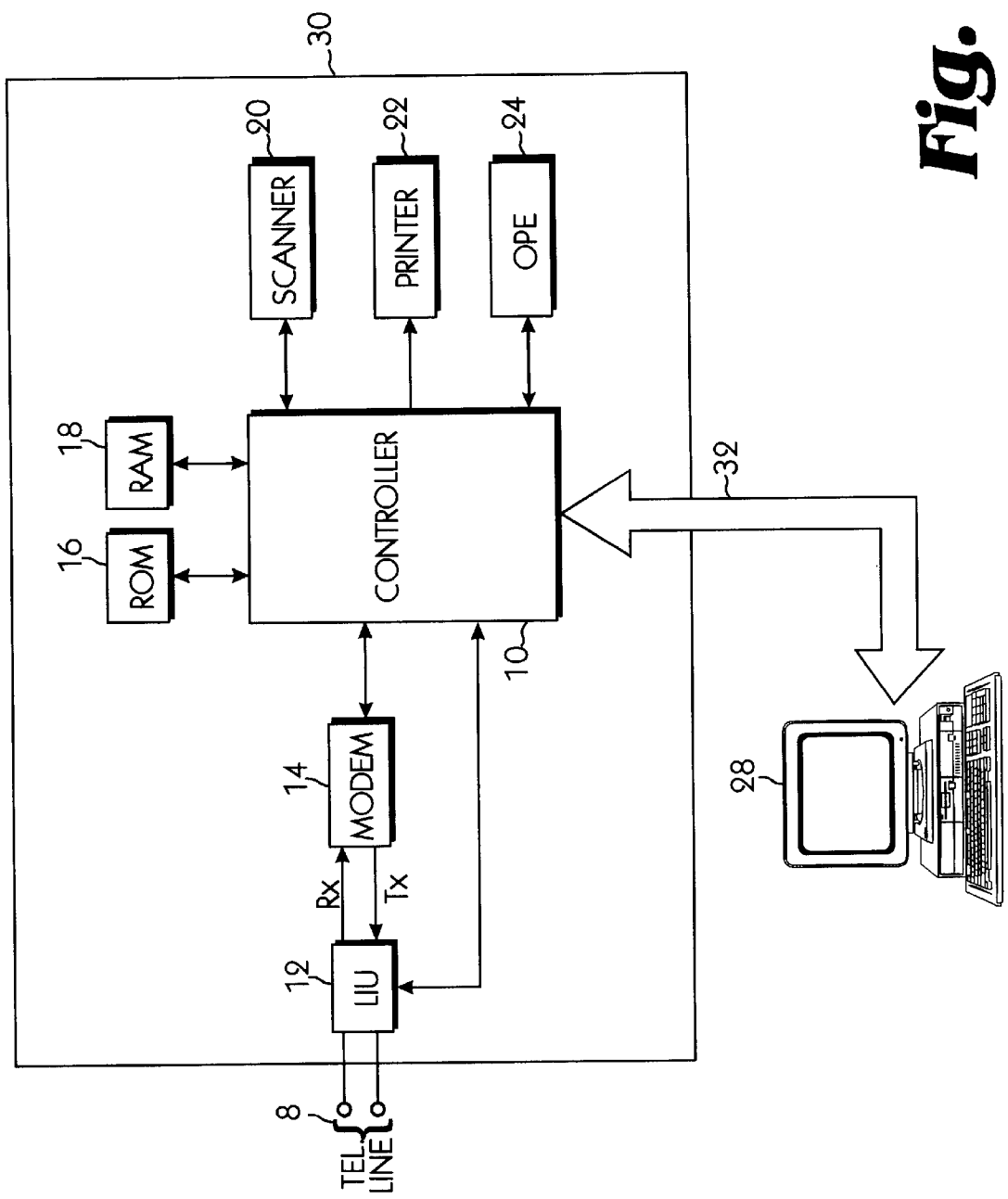
FIG. 1 is a block diagram of a multi-functional facsimile connected to a personal computer in accordance with the principles of the present invention.

Turning now to the drawings, FIG. 1 illustrates a multi-functional facsimile device 30 connected to personal computer 28 via a cable 32. In the drawing, controller 10 regulates the overall operation of the multi-functional facsimile device. Line interface unit (LIU) 12 connects a telephone line 8 to modem 14 and is regulated by controller 10. Line interface unit 12 detects the ring signal of an incoming call and sends a ring detection signal to controller 10. Modem 14 has a full duplex connection to line interface unit 12. Modem 14 demodulates the signal received through line interface unit 12 and modulates a transmission signal to be transmitted to telephone line 8 via line interface unit 12. ROM (Read Only Memory) 16 stores the control program for controller 10. RAM (Random Access Memory) 18 stores received image data, scanned image data, and temporarily stores data generated in the course of performing the facsimile function. Scanner 20 reads a document and converts the images on the document into binary data under the regulation of controller 10. Printer 22 records the received or scanned image data onto a printable medium such as cur sheets of paper. Operating panel (OPE) 24 includes a number of controls for setting various functions of facsimile 30 and for sending various command signals to controller 10.

Operating panel 24 generates command signals that are sent to the controller according to manipulations of the various controls by a user. In addition, operating, panel 24 also includes a display panel that shows the operational status of the facsimile. A cable 32 connects the facsimile 30 to personal computer 28 and transmits data received via telephone line 8 to the computer. Facsimile document data is received by personal computer 28 through cable 32 that connects facsimile 30 to computer 28.

Multi-functional facsimile 30 has two different receiving modes, the facsimile mode and the PC (personal computer) mode. When multi-functional facsimile 30 is in the facsimile mode it will print all received facsimile documents directly. When facsimile 30 is in PC mode, any data to be transmitted or received bypasses scanner 20 or printer 22, respectively, and is handled directly by the personal computer 28. The PC mode runs using software that is installed in personal computer 28.

When operating in the PC mode, the multi-functional facsimile 30 constructed according to the principles of the present invention transmits the ring signal to personal computer 28, after sending a ring detection signal to controller 10. The controller may be constructed using a microprocessor After the first ring signal is detected, controller 10 waits for a predetermined number of ring signals for personal computer 28 to respond with the appropriate acknowledgment signal. If computer 28 responds within the predetermined number of ring signals, then the document data is transferred to personal computer 28. If however, personal computer 28 does not respond to the ring signals with an acknowledgment signal within the predetermined number of ring signals, the communication path to the personal computer is disconnected and the image data is printed by printer 22 by directly using the multi-functional facsimile device.

Figure 2:
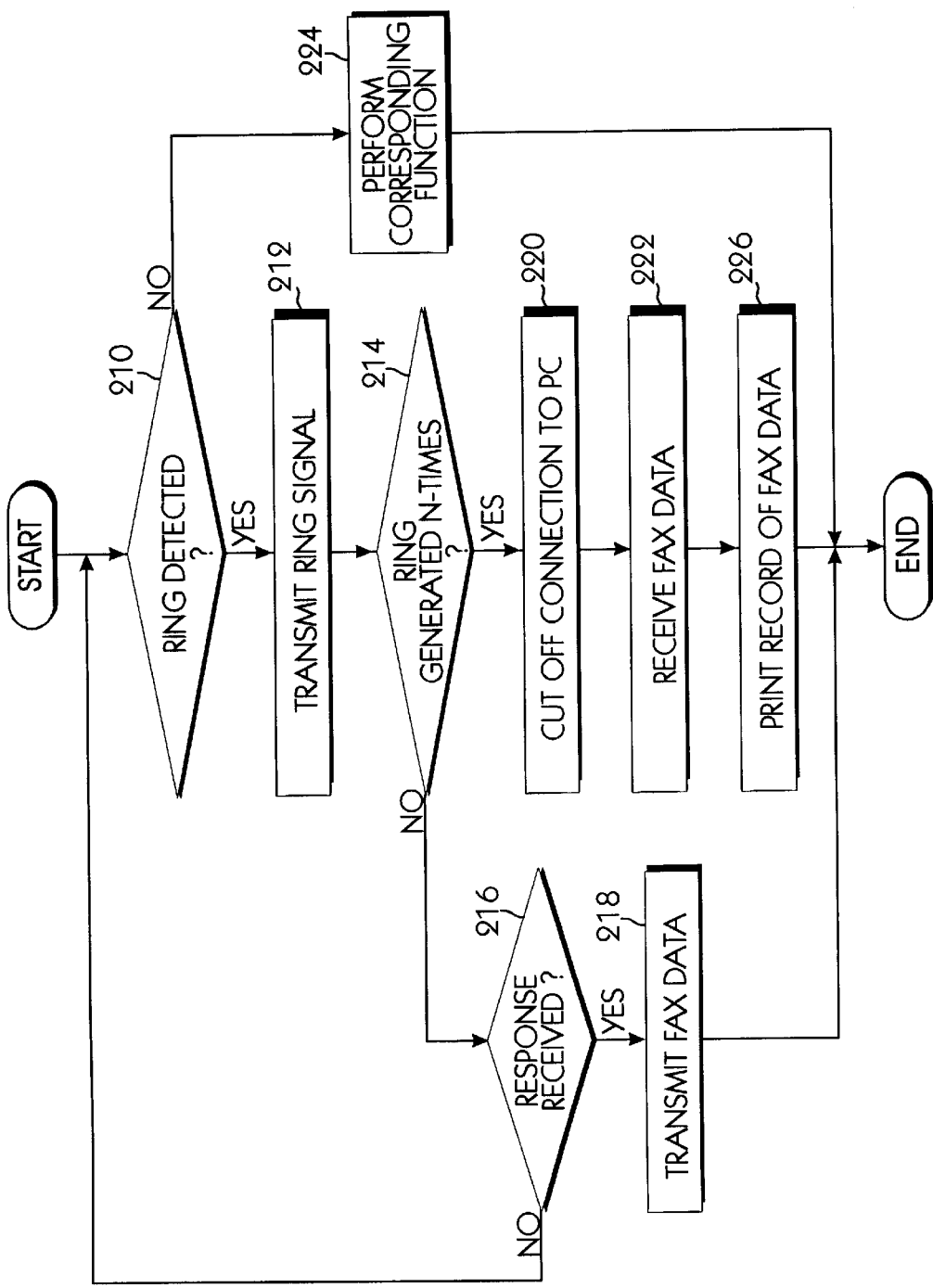
FIG. 2 is a flow chair of a method for forcibly generating a facsimile document using a multi-functional facsimile machine performed as a preferred embodiment of the present invention.

FIG. 2 illustrates the method used to control the multi-functional facsimile device. When there are no communication problems between computer 28 and the controller 10, controller 10 executes steps 210 through 218 to enable computer 28 to receive the facsimile document. More specifically, during step 210, controller 10 checks whether line interface unit 12 has detected the ring signal of an incoming call on line 8. Once a ring signal is detected, controller 10 performs step 212 is and transmits the ring signal to the CPU (Central Processing Unit) of personal computer 28. Then, during step 216, the controller checks whether personal computer 28 responds to the ring signal.

In step 214, controller 10 continues to wait for a response from personal computer 28 in the form of an acknowledgment signal, until a ring signal has been detected a predetermined number of times without a response from the computer 28. If a response to the ring signal is not received at step 216, the controller returns to step 210. If however, a response to the ring signal is received, controller 10 performs step 218 and transmits the facsimile data to the computer 28. An appropriate and responsive acknowledgment signal in reply to the ring signal would be one that indicates that personal computer 28 is ready to receive data representative of the facsimile document and that instructs the transmitting facsimile or similar device what modulation and coding formats the receiving computer accepts. During step 218, controller 10 has the facsimile document transmit through line interface unit 12, through modem 14, through the cable 32, and directly to the central processing unit of personal computer 28. After the reception of the facsimile document is complete, personal computer 28 can print out the facsimile or display the facsimile on its monitor.

When the facsimile document can not be transferred to personal computer 28 because of some system interruption such as a poor cable connection or the computer being turned off, controller 10 executes steps 220 and 222 to automatically print the facsimile document using the multi-functional facsimile. More specifically, in step 214, controller 10 checks whether the ring signal has been received a predetermined number of times. If personal computer 28 does not respond to the ring signal before a predetermined number of ring signals have been received, then controller 10 determines that there is a hardware, software, or power problem with personal computer 28 and performs step 220 by terminating the connection between modem 14 and computer 28 using either a hardware or software switch. Then, during step 222 controller 10 receives the facsimile data via line interface unit 12 and modem 14. The received facsimile data is temporarily stored in RAM 18 and then printed using printer 22 when a predetermined amount of the facsimile data has been stored in the written into memory 18.

As described in the foregoing, when a personal computer can not receive facsimile data from the calling facsimile, this multi-functional facsimile terminates the connection to that personal computer and automatically prints the facsimile document. This should significantly increase the reception rate of facsimile receives gently. Moreover, my multi-functional facsimile machine automatically records the document data on a printable medium when the appropriate response signal is not received from the personal computer would increase the reliability of the multi-functional facsimile machine and increase the efficiency of the office that uses the facsimile.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A process for the automatic printing of a facsimile document by a multi-functional image reading and recording device, comprising the steps of:

detecting a ring signal indicating transmission of data representing a facsimile of images borne by a document to a local multi-functional image reading and recording device dedicated to printing said images in response to reception of said data and to generating said data by scanning said images from documents;

generating a detection signal when said ring signal is detected;

transmitting said ring signal to a computer connected to said multi-functional image reading and recording device;

determining whether said response has been generated by said computer;

making a determination during an interval established by transmission of a predetermined number of ring signals, of whether said computer has generated a response to acknowledge reception of said ring signal during said interval;

initiating said device to receive said data and store said data in a memory of said device on the basis of said determination when said computer fails to generate said response during said interval without printing images corresponding to said data onto a printable medium conveyed through multi-functional image reading and recording device; and transmitting said data to said computer when said response has been generated by said computer during said interval.

2. The process of claim 1, further comprised of the steps of:

activating a switch to terminate a connection between said computer and said multi-functional image reading and recording device on the basis of said determination;

receiving said data for said facsimile document and storing said data in said memory; and printing said data stored in said memory after said data has been stored in said memory.

3. The process of claim 1, further comprised of the step of connecting said device to said memory on the basis of said determination.

4. A system for receiving a facsimile documents in a multi-functional image reading and recording device, comprising:

a computer automatically generating a response signal whenever a ring signal is received by said device;

a controller connected to said computer, sending a detection signal to said computer when said ring signal is detected and making a determination of of whether a response signal has been generated by said computer in response to said ring signal; and a randomly addressed memory connected to said controller, storing data for said facsimile document transmitted from a modem connected to said controller on the basis of said determination by said controller when said response signal does not exist from said computer during a period of time without printing said data on a printable medium.

5. The device of claim 4, further comprised of a printer connected to said controller, printing said data stored in said randomly addressable memory on the basis of said determination of said controller after said data has been stored in said memory.

6. The system of claim 4, further comprised of a switch for disconnecting said computer from said multi-functional image reading and recording device and connecting said controller to said randomly addressable memory.

7. A process for the receiving data representing a facsimile document in a multi-functional image reading and recording device, comprising the steps of:

detecting a ring signal indicating transmission of data;

transmitting said ring signal to a computer connected to said multi-functional image reading and recording device;

making a determination of whether a response from said computer to acknowledge reception of said ring signal exists during a period of time;

initiating said device to receive said data to store said data in a random access memory of said device on the basis of said determination when said said computer fails to generate said response during said period of time without printing images corresponding to said data onto a printable medium conveyed through said device; and transmitting said data to said computer when said response has been generated by said computer during said interval.

8. The process of claim 7, further comprised of the steps of:

storing said data in a plurality of random access memories; and allowing a printer connected to said device to print said data stored in said random access memories after said data has been stored in said memories.

9. The process of claim 7, further comprised of the step of connecting said device to said random access memory on the basis of said determination.

* * * * *